(12) United States Patent
Kohn et al.

(10) Patent No.: US 7,248,585 B2
(45) Date of Patent: Jul. 24, 2007

(54) METHOD AND APPARATUS FOR A PACKET CLASSIFIER

(75) Inventors: Leslie D. Kohn, Fremont, CA (US);
Michael K. Wong, San Mateo, CA (US)

(73) Assignee: Sun Microsystems, Inc., Santa Clara, CA (US)

( * ) Notice: Subject to any disclaimer, the term of this patent is extended or adjusted under 35 U.S.C. 154(b) by 1041 days.

(21) Appl. No.: 10/272,783

(22) Filed: Oct. 16, 2002

(65) Prior Publication Data

US 2003/0081615 A1 May 1, 2003

Related U.S. Application Data

(60) Provisional application No. 60/345,315, filed on Oct. 22, 2001.

(51) Int. Cl.
*H04L 12/56* (2006.01)
(52) U.S. Cl. .................................. 370/392
(58) Field of Classification Search ............... None
See application file for complete search history.

(56) References Cited

U.S. PATENT DOCUMENTS

| | | | | |
|---|---|---|---|---|
| 6,292,483 B1 * | 9/2001 | Kerstein | ................ | 370/389 |
| 6,434,662 B1 * | 8/2002 | Greene et al. | ............ | 711/108 |
| 6,453,360 B1 * | 9/2002 | Muller et al. | ............ | 370/392 |
| 6,567,839 B1 | 5/2003 | Borkenhagen et al. | | |
| 6,754,662 B1 * | 6/2004 | Li | ................ | 707/101 |
| 6,904,040 B2 * | 6/2005 | Salapura et al. | ....... | 370/395.32 |
| 6,950,434 B1 * | 9/2005 | Viswanath et al. | ......... | 370/392 |
| 6,980,550 B1 * | 12/2005 | Yip et al. | ................ | 370/392 |

FOREIGN PATENT DOCUMENTS

WO    WO 01 78309    10/2001

OTHER PUBLICATIONS

Chandranmenon G P et al., "Trading Packet Headers For Packet Processing", IEEE/ACM Transactions on Networking, vol. 4, No. 2, Apr. 1996.

* cited by examiner

*Primary Examiner*—Chi Pham
*Assistant Examiner*—Anh-Vu Ly
(74) *Attorney, Agent, or Firm*—Martine Penilla & Gencarella, LLP

(57) ABSTRACT

In one embodiment, a method for efficiently classifying packets for a multi-processor/mutli-thread environment is provided. The method initiates with receiving a packet. Then, header information is extracted form the received packet. Next, a first hash value is calculated. Then, a field of interest in a lookup table is determined from the first hash value. Next, a second hash value is calculated. Then, the second hash value is compared to stored hash values in the field of interest of the lookup table to determine a match between the second hash value and one of the values in the field of interest of the lookup table. If there is a match, the received packet is transmitted to a processor corresponding to the one of the values in the row location of the lookup table. A network interface card and a system for efficiently classifying packets in a multicore/multithread environment are also provided.

20 Claims, 5 Drawing Sheets

METHOD AND APPARATUS FOR A PACKET CLASSIFIER

CROSS REFERENCE TO RELATED APPLICATIONS

This application claims priority from U.S. Provisional Patent Application No. 60/345,315 filed Oct. 22, 2001 and entitled "High Performance Web Server". This provisional application is herein incorporated by reference.

BACKGROUND OF THE INVENTION

1. Field of the Invention

This invention relates generally to processor architecture and more particularly to packet classification for a network interface.

2. Description of the Related Art

Servers having multiple cores on a shared network interface on a chip require that an incoming packet be classified in order to determine which of the multiple cores are assigned to handle the particular packet. Without the packet classifier, incoming packets from a single flow may be assigned to different cores resulting in serialization of processing between cores. Packets of the same flow may still be assigned to the same processor core, however, this process has more overhead. For example, if the packet is forwarded to the wrong core, that core may need to forward the packet to the correct core.

Packet classification systems typically require that a match on the L2–L4 section of the packet header is made to identify a particular flow. One packet classification algorithm incorporates a single hashing into the packet classification process. Here, a single hash value corresponding to the combined fields of interest, i.e., source, destination, port number, etc., of the packet is calculated. The calculated hash value is then used to index in a lookup table containing the exact L2–L4 flow information, i.e., key for use in a matching operation. However, the size of the lookup table becomes excessive when dealing with the millions of flows which can be active at the same time in a multi-core/multi-thread chip especially with regard to a server application. Additionally, the communication link with the lookup table needs to have a high bandwidth to support the packet classification system, especially in high bandwidth environments, such as a multiple 1 gigabit (GB) environment or a 10 GB environment. Therefore, the hashing algorithms used for packet classification are not optimal for a server having multi-core/multi-thread chips due to the excessive size of the lookup table required to support such a system.

FIG. 1 is a graphical representation of a hash lookup table used for packet classification. Hash lookup table 100 consists of a number of rows and columns. Key 102 is extracted from an incoming packet header. A hash is then calculated to provide row number 104. The calculated hash is then used to index into the row where key 102 is stored. The entire key is stored in the indexed position of hash table 100. Hardware then extracts the keys and compares each key with the incoming key to find an exact match. Depending on the Internet protocol (IP) used for transmitting the data over the Internet each key is between about 100 and about 300 bits. Accordingly, a table storing a large number of keys becomes excessively large. Additionally, the bandwidth required for supporting a multi-chip/multi-core processing environment also becomes excessive.

In view of the forgoing, there is a need define a packet classification system configured to efficiently support a multi-chip/multi-core processing environment in a manner that reduces the bandwidth required to support the classification system and reduces the storage requirements for the lookup table.

SUMMARY OF THE INVENTION

Broadly speaking, the present invention fills these needs by providing a packet classifier configured to efficiently operate in a multi-core/multi-thread environment. It should be appreciated that the present invention can be implemented in numerous ways, including as an apparatus, a system, a device, or a method. Several inventive embodiments of the present invention are described below.

In one embodiment, a method for efficiently classifying packets for a multi-processor/mutli-thread environment is provided. The method initiates with receiving a packet. Then, header information is extracted from the received packet. Next, a first hash value is calculated. Then, a field of interest in a lookup table is determined from the first hash value. Next, a second hash value is calculated. Then, the second hash value is compared to stored hash values in the field of interest of the lookup table to determine a match between the second hash value and one of the values in the field of interest of the lookup table. If there is a match, the received packet is transmitted to a processor corresponding to the one of the values in the row location of the lookup table.

In another embodiment, a method for performing optimistic hash matching is provided. The method initiates with defining a lookup table having a plurality of values stored therein. Each of the plurality of values of the lookup table is associated with at least one processor. Then, a packet is received. Next, a key is extracted from the packet. Then, a first hash value and a second hash value are calculated from the key. Next, a field of interest within the lookup table corresponding to the first hash value is located. Then, the second hash value is compared to values within the field of interest to identify a match between the second hash value and one of the values within the field of interest. Next, the received packet is sent to a processor corresponding to the one of the values within the field of interest.

In yet another embodiment, a network interface card is provided. The network interface card includes circuitry for receiving a packet. Packet classifier circuitry is included. The packet classifier circuitry is configured to calculate a first hash value and a second hash value from fields of a packet header of the received packet. The first hash value indicates a field of interest associated with a lookup table in communication with the network interface card. The second hash value matches a value within the field of interest to identify a processor assigned to the packet. Circuitry for transmitting the packet to a queue associated with the processor assigned to the packet is included.

In still yet another embodiment, a system for efficiently classifying packets in a multicore/multithread environment is provided. The system includes a multi-processor chip in communication with the semiconductor chip capable of storing data. The multiprocessor chip includes a plurality of processor cores and a network interface card (NIC) for receiving a packet from a network. The NIC includes packet classifier circuitry configured to calculate a first hash value and a second hash value from a packet header of the packet. The first hash value indicates a field of interest in a table. The second hash value identifies data at a location in the field of interest. The data indicates one of the plurality of processor cores for the packet to be sent to. The system includes a semiconductor chip configured to store data associated with the table. The semiconductor chip is in communication with the multi-processor chip.

Other aspects and advantages of the invention will become apparent from the following detailed description, taken in conjunction with the accompanying drawings, illustrating by way of example the principles of the invention.

BRIEF DESCRIPTION OF THE DRAWINGS

The present invention will be readily understood by the following detailed description in conjunction with the accompanying drawings, and like reference numerals designate like structural elements.

DETAILED DESCRIPTION OF THE PREFERRED EMBODIMENTS

An invention is described for an apparatus and method for classifying packets for a multithread/multicore environment through an optimistic hashing process. It will be obvious, however, to one skilled in the art, that the present invention may be practiced without some or all of these specific details. In other instances, well known process operations have not been described in detail in order not to unnecessarily obscure the present invention. The term about as used herein refers to a range of +/−10% of the corresponding value.

The embodiments described herein provide an optimistic hashing process for a packet classifier. In one embodiment, a first hash value of the fields of interest is calculated initially. Then, a second hash value is computed from the L2–L4 information of the packet header. The second hash value is then stored in the lookup table. It should be appreciated that different algorithms are used to compute the first and second hash values. The second hash value is significantly smaller than the exact L2–L4 packet header information extracted for the key, in terms of bit size, thereby reducing the size required for the lookup table. The size of the first and second hash values are comparable in one embodiment. In addition, the bandwidth required between the chip having the lookup table and the multi-core/multi-thread chip is likewise reduced. Since there may be collisions as a result of the second hashing, software can determine if an exact match has occurred by examining the packet header.

Figure 1:
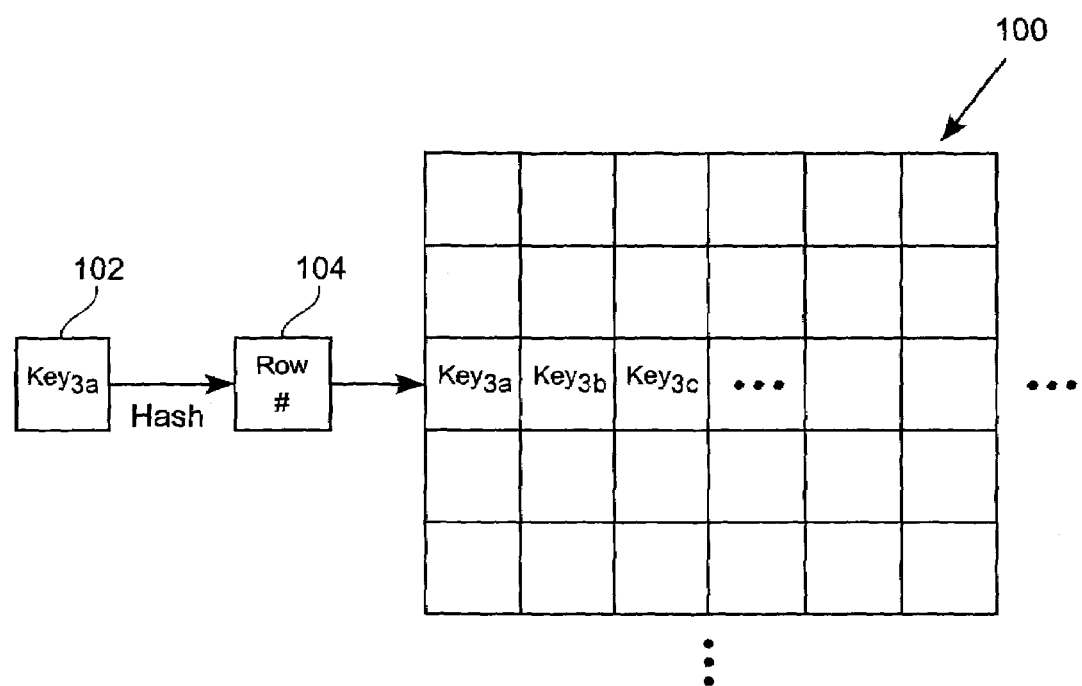
FIG. 1 is a graphical representation of a hash lookup table used for packet classification.
Figure 2:
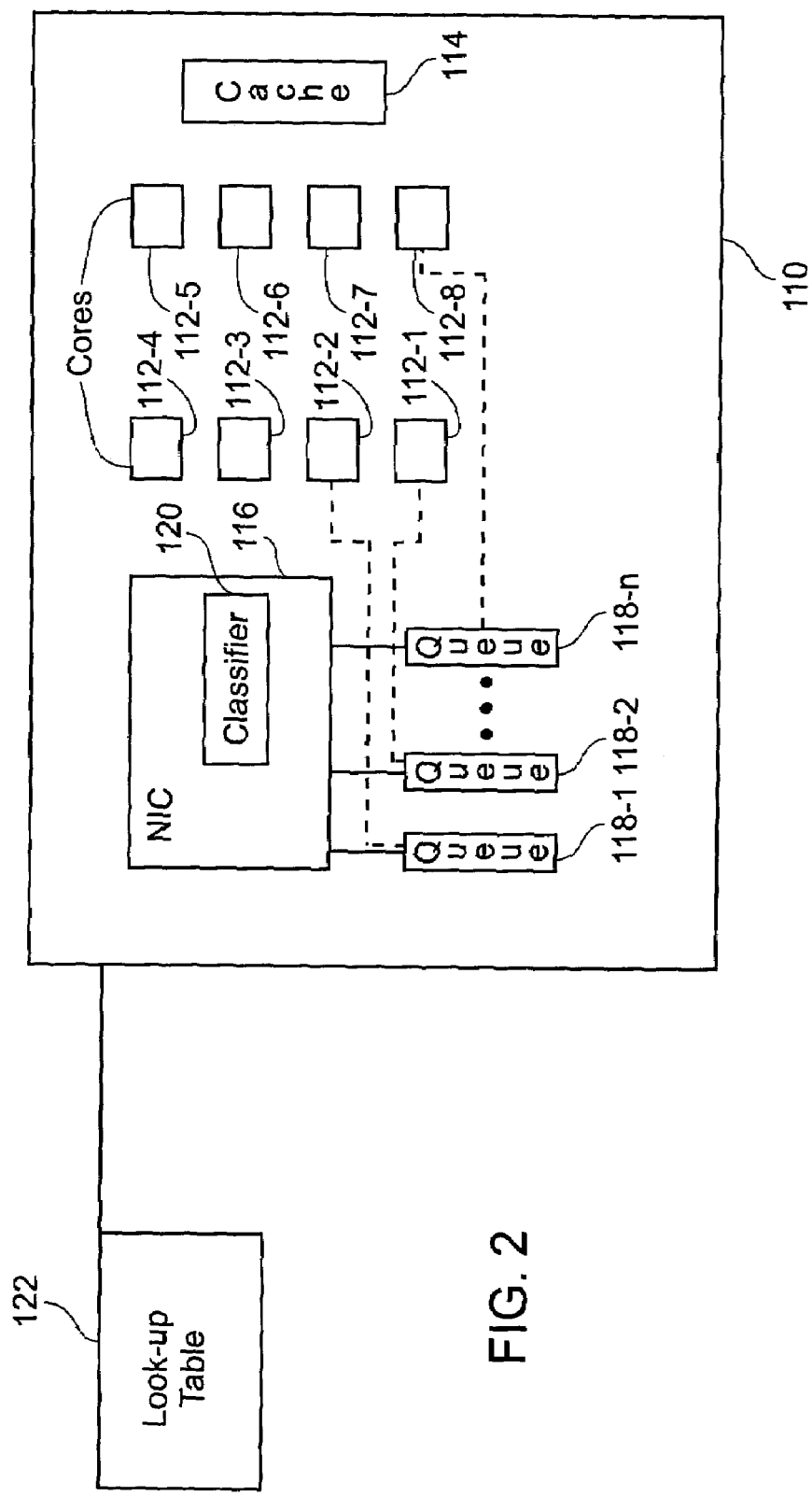
FIG. 2 illustrates a simplified schematic diagram of the multi-core/multi-thread chip having a packet classifier configured to execute the optimistic hashing process in accordance with one embodiment of the invention.

FIG. 2 illustrates a simplified schematic diagram of the multi-core/multi-thread chip having a packet classifier configured to execute the optimistic hashing process in accordance with one embodiment of the invention. Multiprocessor chip 110 includes multiple processing cores 112-1 through 112-8 and cache memory 114. Network interface card (NIC) 116 is included on chip 110. Packet classifier 120 includes circuitry configured to examine incoming packet headers by performing the hashing processes described below. The hash values are compared to values stored in lookup table 122 to determine which processor core is assigned to an incoming packet. Once the assigned processing core 112-1 through 112-8 has been determined the packet is transmitted to a queue 118-1 through 118-n that corresponds to the assigned processor. In one embodiment, the number of queues 118-1 through 118-n is equal to the number of processing cores 112-1 through 112-8 on chip 110. Thus, where chip 110 has 8 processing cores 112-1 through 112-8, then the number of queues 118-1 through 118-n is equal to 8. It should be appreciated that chip 110 is shown having 8 processing cores 112-1 through 112-8 for exemplary purposes only and is not meant to be limiting, as the chip may have any suitable number of processing cores. One skilled in the art will appreciate that lookup table 122 may be located on a semiconductor chip in communication with multiprocessor chip 10. In another embodiment, lookup table 122 is stored in a memory, such as a fast cycle dynamic random access memory (FCDRAM). It should be appreciated that chip 110 and lookup table 122 can be incorporated into a server computer configured to execute server applications, such as a web server. Exemplary server applications include electronic commerce applications, database applications, etc.

Figure 3:
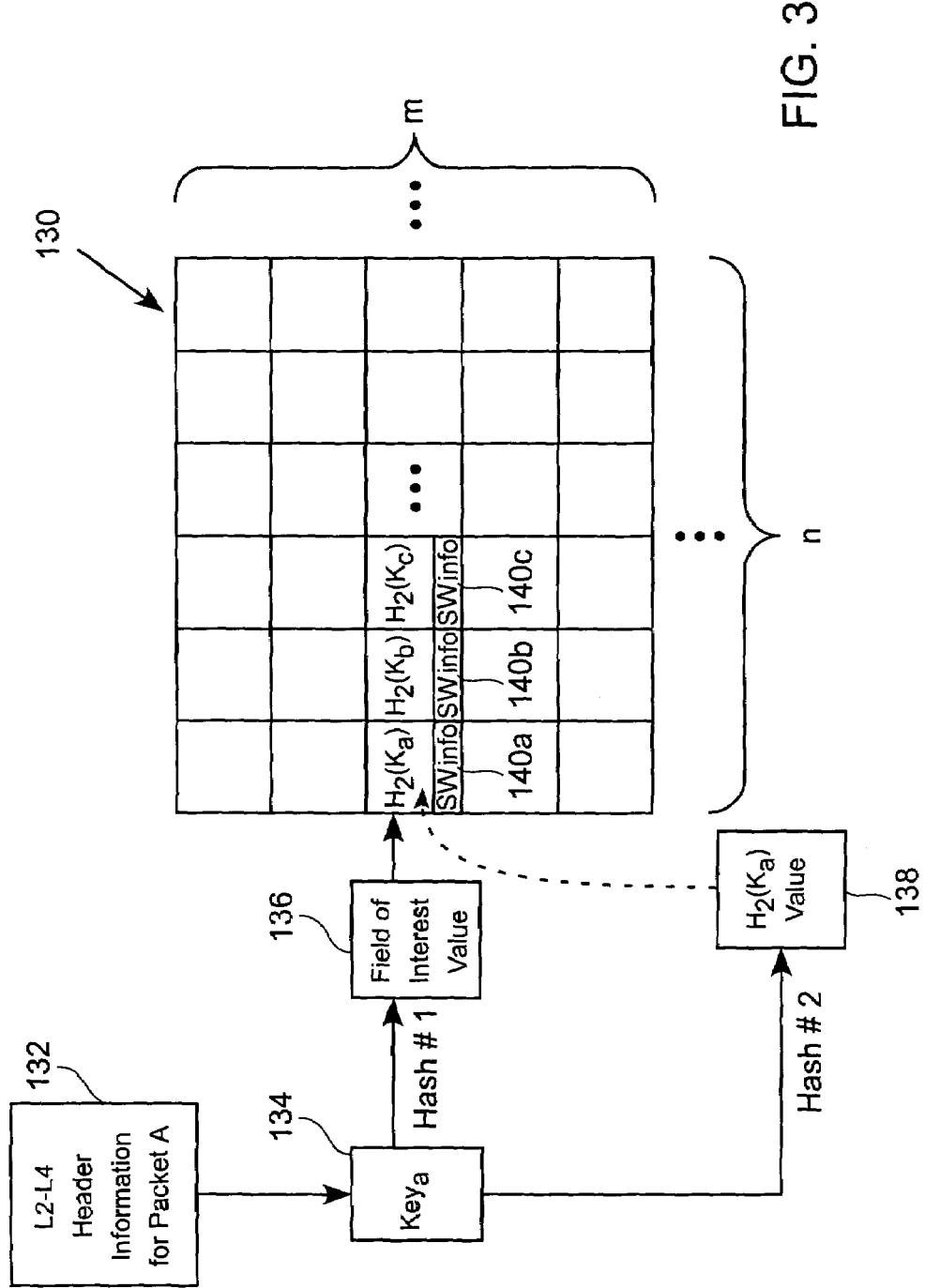
FIG. 3 is a schematic diagram of the two stage optimistic hashing for determining a processor assigned to an incoming packet in accordance with one embodiment of the invention.

FIG. 3 is a schematic diagram of the two stage optimistic hashing for determining a processor assigned to an incoming packet in accordance with one embodiment of the invention. The L2–L4 header information for incoming packet A 132 is extracted by a NIC. For example, the NIC of FIG. 2 is a suitable NIC having circuitry for parsing and extracting the L2–L4 header information from an incoming packet. From the parsing and extraction, $Key_A$ 134 associated with the incoming packet is provided in one embodiment. A first hash operation is performed on $Key_A$ 134 that results in first hash value 136 that indicates a field of interest of hash lookup table 130. For example, first hash value 136 indicates a row number in one embodiment of the invention. A second hash operation is performed on $Key_A$ 134 resulting in value $H_2(K_A)$ 138. It should be appreciated that the algorithm performing the second hash operation is different than the algorithm performing the first hash operation. In one embodiment, the resulting value of the second hash operation is much smaller than the bit size of the key. For example, the resulting value of the second hash operation may 16 bits or less, which is at least an order of magnitude less than the bit size of the key in one embodiment of the invention. It should be appreciated that the second hash value may be smaller than the first hash value. The second hash value is then used to compare with each of the stored hash values in the field of interest of hash table 130. Here, a match occurs between the resulting value of the second hash operation $H_2(K_A)$ 138 and the stored value in column 1 of the field of interest of hash table 130. Associated with each of the entries in hash lookup table 130 is software information 140. Thus, when a match is determined, software information 140 may be extracted to direct the incoming packet to a processing core associated with the matched stored value of hash lookup table 130. For example, software information 140 may be in the form of code programmed into hash lookup table 130. In one embodiment, the code has a handle that directs the packet to a queue associated with the processor assigned to the matched position of the hash lookup table. It should be appreciated that hash lookup table 130 consists of m rows and n columns, where m and n are any suitable integers.

Figure 4:
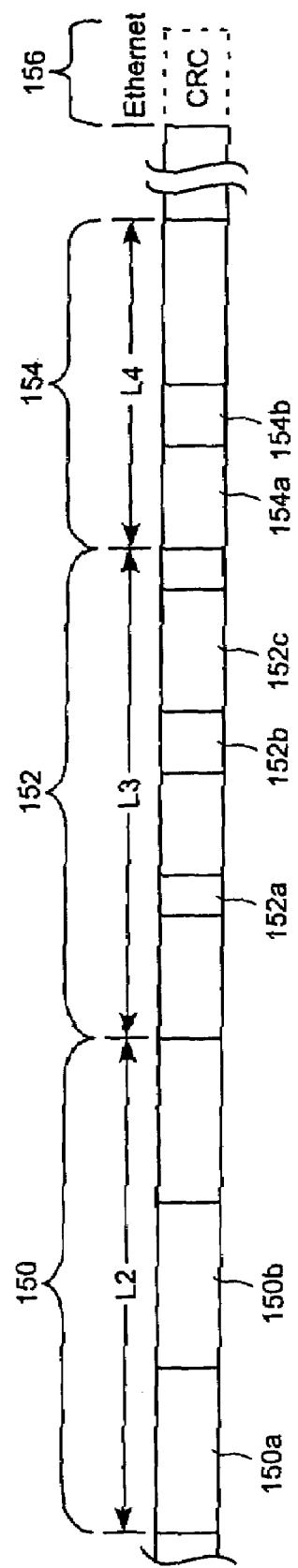
FIG. 4 is a high level schematic diagram of the L2–L4 segments of a packet header defining a key used for hashing operations in accordance with one embodiment of the invention.

Of course, hash lookup table 130 of FIG. 4 is built prior to having the capability to match second hash values. In one embodiment, hash lookup table is constructed as packets are being processed. For example, where a match is not found, the packet is assigned to a processor core through a round robin process. The unmatched hash value is then stored in hash lookup table 130 so that future packets having the same hash value can be matched and subsequently assigned to a particular processor core without going through the round robin process.

FIG. 4 is a high level schematic diagram of the L2–L4 segments of a packet header defining a key used for hashing operations in accordance with one embodiment of the invention. An incoming header of a data packet includes layer 2 (L2) 150, layer 3 (L3) 152, layer 4 (L4) 154 and cyclic redundancy check (CRC) layer 156 among other layers. L2 150 includes destination address 150a and source address 150b among other information generally known by one skilled in the art. L3 152 includes protocol segment 152a, e.g. transmission control protocol (TCP), user datagram protocol (UDP), etc. Source address segment 152b and destination address segment 152c may also be considered by the hashing algorithm. L4 154 includes source port 154a and destination port 154b. It will be apparent to one skilled in the art that not all the fields of the layers are illustrated in FIG. 4 due to illustration limitations. However, the fields shown are parsed and extracted from an incoming header in order to define a key, as discussed with reference to FIG. 3, in one embodiment of the invention. Furthermore, the invention is not limited to the above described fields as any suitable fields may be considered by the hashing algorithm.

Collisions may occur due to the storage of a hash value rather than the larger bit size key. That is, even though two incoming packets may have different keys, there is a small chance that the calculated hash values may be the same for the two packets. The hardware may assign the two packets to the same processor or same data flow. In one embodiment, the software check on the actual header information will resolve the collision.

Figure 5:
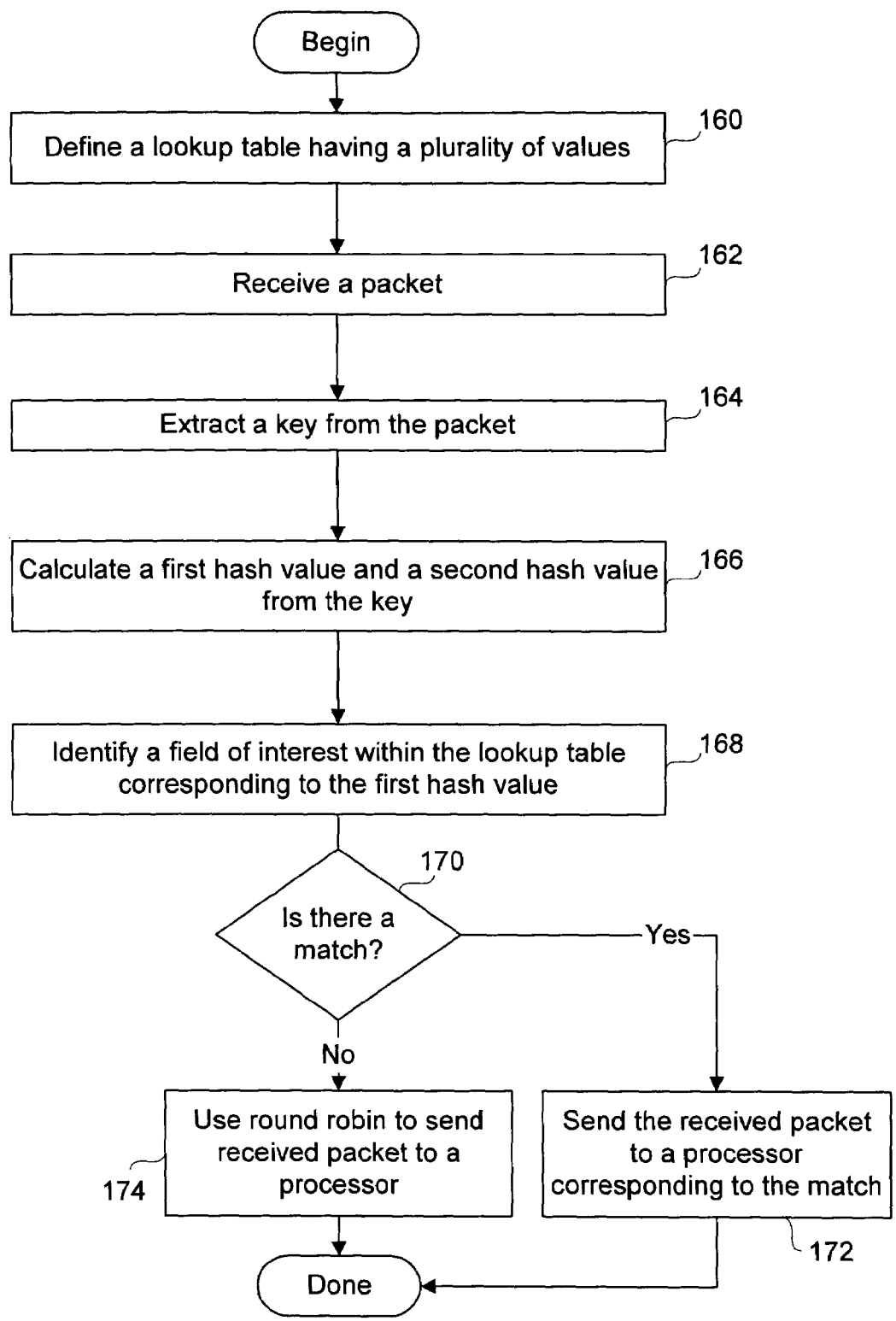
FIG. 5 is a flowchart of the method operations for performing a two step hash matching process to determine which processor of a multi-processor chip the incoming packet is sent to in accordance with one embodiment of the invention.

FIG. 5 is a flowchart of the method operations for performing a two step hash matching process to determine which processor of a multi-processor chip the incoming packet is sent to in accordance with one embodiment of the invention. The method initiates with operation 160 where a lookup table having a plurality of values is defined. In one embodiment, a suitable lookup table is the table with reference to FIG. 3 and contains a plurality of hash values stored in cells defined by columns and rows. The lookup table may be located on a chip in communication with the multi-processor chip. In one embodiment, the lookup table is stored in a memory chip, e.g., a fast cycle dynamic random access memory (FCDRAM). The method then advances to operation 162 where a packet is received. For example, a network interface card (NIC) may receive the packet from a distributed network, such as the Internet. The method then proceeds to operation 164 where a key from the packet is extracted. In one embodiment, fields within the L2–L4 layers of a packet header are parsed to extract the information for the key. The method then moves to operation 166 where a first and a second hash value are calculated from the key. In one embodiment, the second hash value is smaller than the extracted key and the first hash value as different hashing algorithms are used to calculate the corresponding values. It should be appreciated that the plurality of hash values defined in the lookup table of operation 160 are calculated through the second hash algorithm.

The method of FIG. 5 then advances to operation 168 where a field of interest within the lookup table is identified through the first hash value. As discussed above with reference to FIG. 3, the field of interest is a row of the hash table as indicated by the value from a first hash operation in one embodiment of the invention. It will be apparent to one skilled in the art that the field of interest can also be a column. The method then proceeds to decision operation 170 where it is determined if there is a match between the second hash value and the hash values stored in the field of interest in the hash lookup table. Here, hardware configured to perform a compare function can execute this operation, i.e. read the field of interest and compare entries in the field of interest to the second hash value. If there is a match between the hash value from the second hash of the key and one of the hash values stored in the field of interest, then the received packet is sent to a processor corresponding to the matched hash value stored in the field of interest in operation 172. In one embodiment, the packet is sent to a queue associated with the processor, i.e., processing core. It should be appreciated that code programmed into the hash table, as discussed with reference to FIG. 3, may be used to direct a packet to a proper queue. If a match is not found, then a round robin process is executed in operation 174 to determine which processor core of a multi-core chip, or queue, to transmit the packet.

In summary, the above described embodiments provide an optimistic hashing process for packet classification. A first hash value is calculated from packet header information to identify a field of interest of a hash lookup table. A second hash value is calculated from the same packet header information to determine if a cell, i.e., location, in the field of interest contains a value matching the second hash value. As described above, values derived from the second hash algorithm are stored in the hash lookup table. The second hash value is significantly smaller than the key, i.e., packet header information, in terms of bit size, therefore the size of the hash lookup table is significantly reduced. For example, a typical key size for an Internet protocol version 4 (IPv4) packet is about 100 bits or greater, while a typical key size for an Internet protocol version 6 (IPv6) packet is about 300 bits. As mentioned above, the bit size for the second hash value is 16 bits or less. In another embodiment, the bit size for the second hash value is 10 bits or less. Of course, the resulting bit size is dependent on the hashing algorithm used to calculate the second hash value. Thus, through the use of the second hash value, the bit size of the stored values in the hash lookup table is reduced by an order of magnitude or more. Consequently, the size of the hash lookup table is significantly reduced. In turn, the bandwidth required for the communication link between a chip containing the hash lookup table and a processor chip is likewise reduced. It should be appreciated that the embodiments described herein may be used with any suitable packet based protocol.

Furthermore the invention may be practiced with other computer system configurations including hand-held devices, microprocessor systems, microprocessor-based or programmable consumer electronics, minicomputers, mainframe computers and the like. The invention may also be practiced in distributing computing environments where tasks are performed by remote processing devices that are linked through a network.

With the above embodiments in mind, it should be understood that the invention may employ various computer-implemented operations involving data stored in computer systems. These operations are those requiring physical manipulation of physical quantities. Usually, though not necessarily, these quantities take the form of electrical or magnetic signals capable of being stored, transferred, combined, compared, and otherwise manipulated. Further, the manipulations performed are often referred to in terms, such as producing, identifying, determining, or comparing.

Any of the operations described herein that form part of the invention are useful machine operations. The invention also relates to a device or an apparatus for performing these operations. The apparatus may be specially constructed for the required purposes, or it may be a general purpose computer selectively activated or configured by a computer program stored in the computer. In particular, various general purpose machines may be used with computer programs written in accordance with the teachings herein, or it may be more convenient to construct a more specialized apparatus to perform the required operations.

Although the foregoing invention has been described in some detail for purposes of clarity of understanding, it will be apparent that certain changes and modifications may be practiced within the scope of the appended claims. Accordingly, the present embodiments are to be considered as illustrative and not restrictive, and the invention is not to be limited to the details given herein, but may be modified within the scope and equivalents of the appended claims.

What is claimed is:

1. A method for efficiently classifying packets for a multi-processor/mutli-thread environment, comprising:
    receiving a packet;
    extracting header information from the received packet;
    calculating a first hash value;
    determining a field of interest in a lookup table from the first hash value;
    calculating a second hash value;
    comparing the second hash value to stored hash values in the field of interest of the lookup table to determine a match between the second hash value and one of the values in the field of interest of the lookup table; and
    if there is a match, transmitting the received packet to a processor corresponding to the one of the values in the row location of the lookup table.

2. The method of claim 1, wherein the second hash value has a smaller bit size than the extracted header information.

3. The method of claim 1, wherein the field of interest is a row of the lookup table.

4. The method of claim 1, wherein the method operation of transmitting the received packet to a processor corresponding to the one of the values in the field of interest of the lookup table includes,
    transmitting the received packet to a queue associated with the processor.

5. The method of claim 1, wherein the method operation of extracting header information from the received packet includes,
    defining a key from fields of a header of the received packet.

6. The method of claim 5, wherein the fields are located in layers 2–4 of the packet header.

7. The method of claim 1, further including:
    if there is not a match, performing a round robin operation to determine which processor to transmit the received packet to.

8. A method for performing optimistic hash matching, comprising:
    defining a lookup table having a plurality of values stored therein, each of the plurality of values being associated with at least one processor;
    receiving a packet;
    extracting a key from the packet;
    calculating a first hash value and a second hash value from the key;
    identifying a field of interest within the lookup table corresponding to the first hash value;
    comparing the second hash value to values within the field of interest to identify a match between the second hash value and one of the values within the field of interest; and
    sending the received packet to a processor corresponding to the one of the values within the field of interest.

9. The method of claim 8, wherein the first and the second hash values are calculated through different hash algorithms.

10. The method of claim 9, wherein the plurality of values in the lookup table and the second hash value are derived through a common hash algorithm.

11. The method of claim 8, further including:
    accessing code associated with the one of the values within the field of interest to determine an address of a processor assigned to the received packet.

12. The method of claim 8 wherein the method operation of sending the packet to a processor corresponding to the one of the values within the field of interest includes,
    holding the packet in a queue associated with the processor.

13. The method of claim 8 further including:
    if there is not a match between the second hash value and one of the values within the field of interest, performing a round robin operation to identify one of a plurality of processors to send the packet to.

14. A network interface card, comprising:
    circuitry for receiving a packet;
    packet classifier circuitry, the packet classifier circuitry configured to calculate a first hash value and a second hash value from fields of a packet header of the received packet, the first hash value indicating a field of interest associated with a lookup table in communication with the network interface card, the second hash value matching a value within the field of interest to identify a processor assigned to the packet; and
    circuitry for transmitting the packet to a queue associated with the processor assigned to the packet.

15. The network interface card of claim 14, wherein the network interface card is on a multi-processor chip.

16. The network interface card of claim 15, wherein the multi-processor chip is contained within a server computer.

17. A system for efficiently classifying packets in a multicore/multithread environment, comprising:
    a multi-processor chip in communication with a semiconductor chip storing data, the multi-processor chip including,
        a plurality of processor cores;
        a network interface card (NIC) for receiving a packet from a network; the NIC having packet classifier circuitry, the packet classifier circuitry configured to calculate a first hash value and a second hash value from a packet header of the packet, the first hash value indicating a field of interest in a table, the second hash value identifying data at a location in the field of interest, the data indicating one of the plurality of processor cores for the packet to be sent to; and a semiconductor chip configured to store data associated with the table, the semiconductor chip in communication with the multi-processor chip.

18. The system of claim 17, wherein the table is stored in a fast cycle dynamic random access memory (FCDRAM).

19. The system of claim 17, wherein the system is a server computer.

20. The system of claim 17, further including:

a set of queues corresponding to the processor cores, such that one queue corresponds to one processor core.

* * * * *